US012732371B2

(12) United States Patent
Lee et al.

(10) Patent No.: US 12,732,371 B2
(45) Date of Patent: Sep. 8, 2026

(54) USER VERIFICATION DEVICE, AUTHENTICATION SYSTEM AND AUTHENTICATION METHOD FOR SECURITY KEY

(71) Applicant: GoTrustID Inc., Irvine, CA (US)

(72) Inventors: Darren Tien-Chi Lee, Irvine, CA (US); Jeng-Lung Li, Taichung City (TW); Yu-Yi Lin, Taichung City (TW)

(73) Assignee: GoTrustID Inc., Irvine, CA (US)

(*) Notice: Subject to any disclaimer, the term of this patent is extended or adjusted under 35 U.S.C. 154(b) by 62 days.

(21) Appl. No.: 18/918,076

(22) Filed: Oct. 17, 2024

(65) Prior Publication Data

US 2026/0025274 A1 Jan. 22, 2026

(30) Foreign Application Priority Data

Jul. 17, 2024 (TW) ................................ 113126745

(51) Int. Cl.
*H04L 9/32* (2006.01)
*H04L 9/08* (2006.01)

(52) U.S. Cl.
CPC .......... *H04L 9/3226* (2013.01); *H04L 9/0877* (2013.01); *H04L 9/3263* (2013.01); *H04L 9/3213* (2013.01)

(58) Field of Classification Search
CPC ... H04L 9/3226; H04L 9/0877; H04L 9/3263; H04L 9/3213
See application file for complete search history.

(56) References Cited

U.S. PATENT DOCUMENTS

2018/0020350 A1* 1/2018 Vissa .................... G06F 1/1698
2018/0101847 A1* 4/2018 Pisut, IV ......... G06Q 20/40145
2019/0114643 A1* 4/2019 Dewitt ............... G06Q 20/3226
2021/0383360 A1* 12/2021 Sinha ................... G06Q 20/405
2023/0063417 A1* 3/2023 Piri ....................... H04W 12/04

* cited by examiner

*Primary Examiner* — Ellen Tran
(74) *Attorney, Agent, or Firm* — JCIPRNET

(57) ABSTRACT

A user verification device, an authentication system, and an authentication method for a security key are provided. The user verification device includes a security chip, a proximity sensor, a connector, and a microcontroller unit. The connector is connected to an electronic apparatus. The microcontroller unit is coupled to the security chip, the proximity sensor, and the connector. When the microcontroller unit receives an identity authentication request from the electronic apparatus through the connector, the microcontroller unit determines whether an object is approaching the user verification device through the proximity sensor. When the microcontroller unit determines that the object is approaching the user verification device through the proximity sensor, the microcontroller unit reads an identity authentication response from the security chip and outputs the identity authentication response to the electronic apparatus through the connector.

11 Claims, 5 Drawing Sheets

USER VERIFICATION DEVICE, AUTHENTICATION SYSTEM AND AUTHENTICATION METHOD FOR SECURITY KEY

CROSS-REFERENCE TO RELATED APPLICATION

This application claims the priority benefit of Taiwan application serial no. 113126745, filed on Jul. 17, 2024. The entirety of the above-mentioned patent application is hereby incorporated by reference herein and made a part of specification.

BACKGROUND

Technical Field

The disclosure relates to an authentication device, and in particular, to a user verification device, an authentication system, and an authentication method.

Description of Related Art

With the rapid development and application of various electronic apparatuses, users have placed increasing requirements on data security protection of electronic apparatuses. An electronic apparatus may be, for example, a personal computer (PC) or a mobile apparatus, and the mobile apparatus may be, for example, a mobile phone or a tablet. In particular, when a user logs in to a network application using a browser of an electronic apparatus, the security of the identity authentication performed on the user is particularly important. Further, it is equally important to enable the user to perform identity authentication conveniently.

However, taking a conventional security key device as an example, a conventional security key device is used to ensure that the user is physically next to the security key device to perform operations, rather than an attacker using computer Trojans or virus software to perform remote operations, so the user may make verification by physically pressing a key or touching the chip. In this regard, since the physical key is implemented in the form of a mechanical button, problems such as occupying a large volume or space and a short service life may be observed. Further, the conventional touch-based sensing methods also have the problem of being unusable due to environmental factors or the user's fingers being dry. For example, in winter, when the heater is on indoors, the air tends to become very dry, causing the user's fingers to lose moisture. As a result, the security key may not respond to touch inputs, leading to frustrating user experiences.

SUMMARY

The disclosure provides a user verification device, an authentication system, and an authentication method for a security key capable of achieving a secure identity authentication function.

The disclosure provides a user verification device including a security chip, a proximity sensor, a connector, and a microcontroller unit. The connector is configured to be connected to an electronic apparatus. The microcontroller unit is coupled to the security chip, the proximity sensor, and the connector. When the microcontroller unit receives an identity authentication request from the electronic apparatus through the connector, the microcontroller unit determines whether an object is approaching the user verification device through the proximity sensor. When the microcontroller unit determines that the object is approaching the user verification device through the proximity sensor, the microcontroller unit reads an identity authentication response from the security chip and outputs the identity authentication response to the electronic apparatus through the connector.

The disclosure further provides an authentication system including an electronic apparatus and a user verification device. The user verification device includes a security chip, a proximity sensor, a connector, and a microcontroller unit. The connector is configured to be connected to the electronic apparatus. The microcontroller unit is coupled to the security chip, the proximity sensor, and the connector. When the microcontroller unit receives an identity authentication request from the electronic apparatus through the connector, the microcontroller unit determines whether an object is approaching the user verification device through the proximity sensor. When the microcontroller unit determines that the object is approaching the user verification device through the proximity sensor, the microcontroller unit reads an identity authentication response from the security chip and outputs the identity authentication response to the electronic apparatus through the connector.

The disclosure further provides an authentication method suitable for a user verification device and an electronic apparatus. The user verification device includes a connector, a proximity sensor, and a security chip. The security authentication method includes the following steps. When the user verification device receives an identity authentication request from the electronic apparatus through the connector, the user verification device determines whether an object is approaching the user verification device through the proximity sensor. When the proximity sensor determines that the object is approaching the user verification device, an identity authentication response is read from the security chip. Further, the identity authentication response is outputted to the electronic apparatus through the connector.

To sum up, in the user verification device, the authentication system, and the authentication method for the security key provided by the disclosure, a secure identity authentication function is provided, and a convenient authentication process is achieved together with the proximity sensor.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
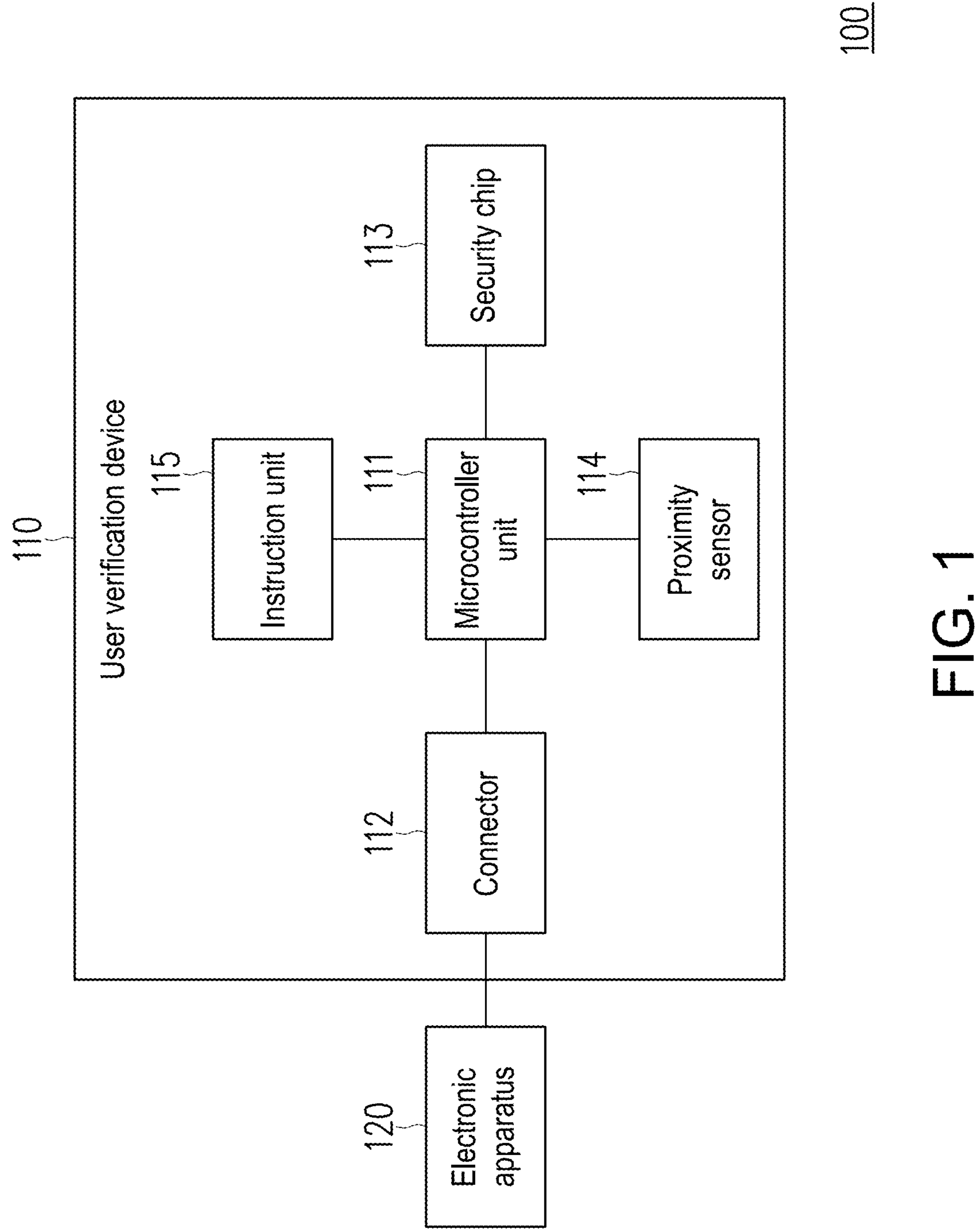
FIG. 1 is a schematic view of an authentication system according to an embodiment of the disclosure.

In order to make the disclosure more comprehensible, several embodiments are described below as examples of implementation of the disclosure. Moreover, elements/components/steps with the same reference numerals are used to represent the same or similar parts in the drawings and embodiments.

The term "coupled to" used in the entire specification (including claims) may refer to any direct or indirect electrical connection means or communication connection means. For instance, if the disclosure describes a first device is coupled to a second device, the description should be explained as the first device may be electrically or communicatively connected to the second device directly, or the first device may be electrically or communicatively connected to the second device indirectly via other devices or some connection means.

FIG. 1 is a schematic view of an authentication system according to an embodiment of the disclosure. With reference to FIG. 1, an authentication system 100 includes a user verification device 110 and an electronic apparatus 120. The user verification device 110 includes a microcontroller unit (MCU) 111, a connector 112, a security chip 113, a proximity sensor 114, and an indication unit 115. The microcontroller unit 111 is coupled to the connector 112, the security chip 112, the proximity sensor 113, and the indication unit 115. In an embodiment, at least two of the microcontroller unit 111, the security chip 113, and the proximity sensor 114 may be integrated into a same chip.

In this embodiment, the connector 112 includes a connection head, and the user verification device 110 is plugged in a socket of the electronic apparatus 120 through the connector 112 in a pluggable manner, so that the user verification device 110 is communicatively connected to the electronic apparatus 120.

In this embodiment, the security chip 13 may be used to, for example, manage authentication data of a user's pre-registered fast identity online (FIDO) protocol (the first-generation FIDO protocol, the second-generation FIDO2 protocol, or the latest protocol may be applied in the disclosure), but the disclosure is not limited thereto. The security chip 113 may also be used to manage authentication data specified by other protocols. In an embodiment, the security chip 113 may also be used to manage the user's pre-registered digital credential or digital signature. In this embodiment, the security chip 113 may be implemented in the form of an independent chip, but the disclosure is not limited thereto. In an embodiment, the security chip 113 may also be disposed in the microcontroller unit 111 or integrated into a single chip.

In this embodiment, the proximity sensor 114 may be a capacitive sensor, an inductive sensor, an electromagnetic sensor, an optical sensor, or an ultrasonic sensor. The proximity sensor 114 may be used to determine whether an object is approaching the user verification device 110. In an embodiment, the user verification device 110 may determine whether a distance between an object and the user verification device 110 is less than a predetermined distance threshold through the proximity sensor 114 to determine whether the object is approaching the user verification device 110. Further, when it is determined that the object is approaching the user verification device 110, the user verification device 110 may further determine whether the continuous time for which the object is approaching the user verification device 110 exceeds a predetermined time threshold to confirm that the object is indeed approaching the user verification device 110. In other words, the proximity sensor 114 may avoid misjudging an object approaching the user verification device 110 due to an accidental touch through a predetermined time length threshold and a predetermined distance threshold. In another embodiment, the proximity sensor 114 may also be configured to detect multiple times of an object approaching the user verification device 110 during a sensing period before determining that the object is approaching the user verification device 110. In another embodiment, the user verification device 110 may also use a specific algorithm to determine whether a gesture is normal by the user, so as to prevent the user verification device 110 from making a wrong motion due to an abnormal obstruction.

In addition, it should be noted that in an embodiment, the aforementioned object may refer to the user's hand, but the disclosure is not limited thereto. Further, the aforementioned object "approaching" the user verification device 110 may mean that the distance between the object and the user verification device 110 is less than the predetermined distance threshold, and the proximity sensor 114 generates a corresponding sensing signal or changes the sensing signal, but the disclosure is not limited thereto as well.

In this embodiment, the indication unit 115 may include, for example, a light emitting diode (LED), but the disclosure is not limited thereto. The indication unit 115 may be used to emit light synchronously during the object sensing period of the proximity sensor 114 to generate an indication signal. For instance, when the indication unit 115 emits light, it means that the proximity sensor 114 is performing sensing, so as to effectively remind the user to wave his/her hand above the proximity sensor 114 or perform other actions approaching the proximity sensor 114.

In this embodiment, the electronic apparatus 120 may be, for example, a personal computer (PC), a mobile apparatus, or other related computer devices, and the mobile apparatus may be, for example, a mobile phone or a tablet. In this embodiment, when the user verification device 110 is connected to the electronic apparatus 120 via the connector 112, the electronic apparatus 120 may execute a browser or an application interface and communicate with the user verification device 110 to perform relevant security authentication operations using the user verification device 110.

Besides, in another embodiment, the user verification device 110 may further include a near-field communication (NFC) antenna, and the NFC antenna may be coupled to the security chip 113, so that the security chip 113 may also perform relevant contactless identity authentication operations through the NFC antenna.

Figure 2:
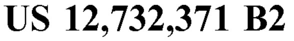
FIG. 2 is a schematic view of a user verification device according to an embodiment of the disclosure.
Figure 2:
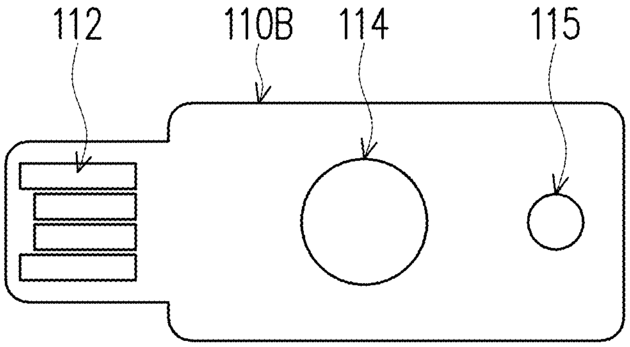

FIG. 2 is a schematic view of a user verification device according to an embodiment of the disclosure. With reference to FIG. 1 and FIG. 2, in this embodiment, the user verification device 110 may be implemented as shown in FIG. 2, for example. The user verification device 110 may include a body 110B (or a device housing), and the body 110B includes a plug structure and two openings. A connection terminal plug structure of the body 110B may be provided with the connector 112 to form a connection terminal, and the connector 112 may include a universal serial bus (USB) interface, so the plug structure of the body 110B may expose relevant pins of the USB. One opening of the body 110B may be provided with a sensing window of the proximity sensor 114, so that the sensing window of the proximity sensor 114 may emit a sensing signal toward the opening of the body 110B of the user verification device 110 to sense whether an object is approaching the user verification device 110. Further, the indication unit 115 may be disposed at another opening of the body 110B, so that the indication unit 115 may emit an indication signal (e.g., indication light) toward the opening.

Figure 3:
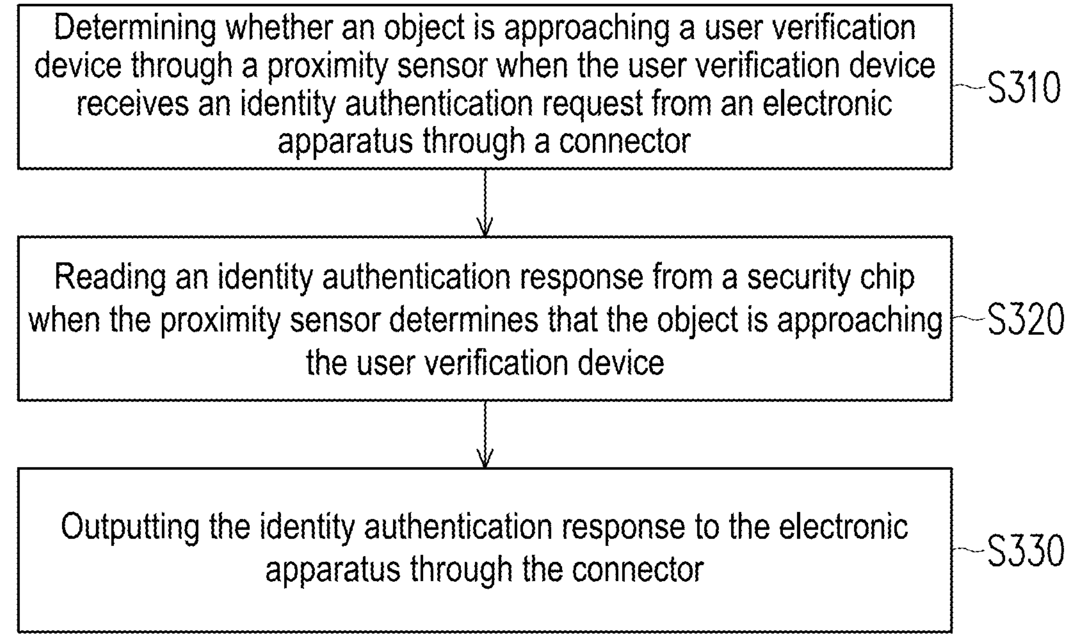
FIG. 3 is a flow chart of an authentication method according to an embodiment of the disclosure.

FIG. 3 is a flow chart of an authentication method according to an embodiment of the disclosure. With reference to FIG. 1 and FIG. 3, the authentication system 100 may execute the following steps S310 to S330 to perform security authentication. In this embodiment, the user may operate the electronic apparatus 120 to run a browser or an application and perform a login operation. The electronic apparatus 120 may issue an identity authentication request. In step S310, when the user verification device 110 receives the identity authentication request from the electronic apparatus 120 through the connector 112, the microcontroller unit 111 determines whether an object is approaching the user verification device 110 through the proximity sensor 114. The identity authentication request may be an online quick identity authentication request, but the disclosure is not limited thereto.

In step S320, when the proximity sensor 114 determines that the object is approaching the user verification device 110, the microcontroller unit 111 reads an identity authentication response (i.e., security key) from the security chip 113. The identity authentication response may be an online quick identity authentication data, but the disclosure is not limited thereto. It should be noted that when the proximity sensor 114 fails to determine that an object is approaching the user verification device 110 for a predetermined determination time, it stops sensing and notifies the microcontroller unit 111 of the authentication failure.

In step S330, the microcontroller unit 111 outputs the identity authentication response to the electronic apparatus 120 through the connector 112. The browser or application executed by the electronic apparatus 120 may perform a login operation based on the relevant authentication data in the identity authentication response. In this way, the authentication system 100 may achieve convenient identity verification and secure login operations.

Figure 4:
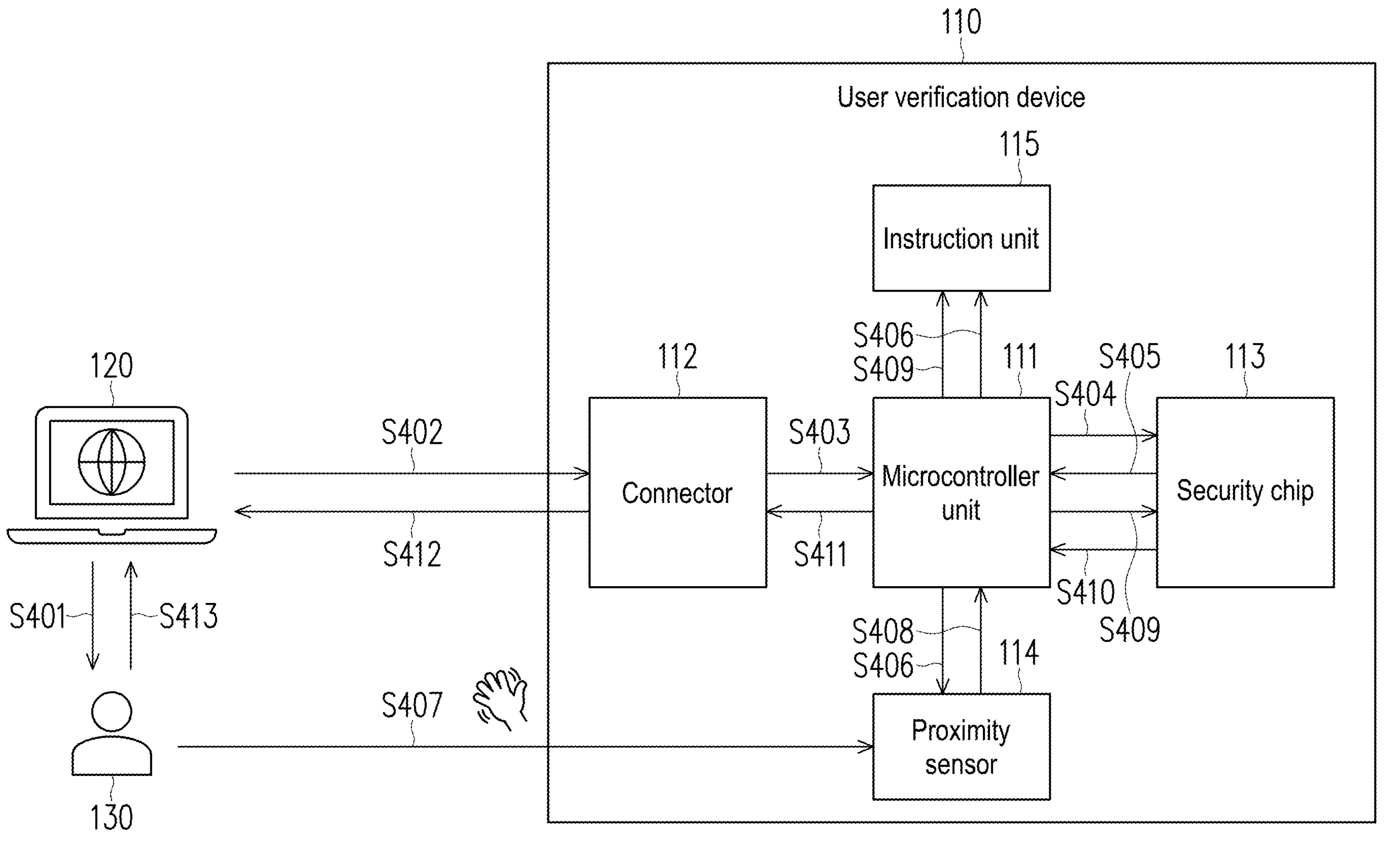
FIG. 4 is a schematic view of an operation of the authentication system according to an embodiment of the disclosure.

To be specific, with reference to FIG. 4, FIG. 4 is a schematic view of an operation of the authentication system according to an embodiment of the disclosure. In this embodiment, the user verification device 110, the electronic apparatus 120, and a user 130 may perform a login operation as follows: steps S401 to S412. In this embodiment, the user 130 may first insert the connection terminal of the user verification device 110 into the corresponding connection port of the electronic apparatus 120, so that the user verification device 110 and the electronic apparatus 120 may communicate with each other. In step S401, the user 130 operates the electronic apparatus 120 to run a browser or an application and performs a login operation. In step S402, the browser or the application executed by the electronic apparatus 120 sends an identity authentication request to the connector 112 of the user verification device 110. In step S403, the connector 112 may send an identity authentication request to the microcontroller unit 111. In step S404, the microcontroller unit 111 may send the identity authentication request to the security chip 113. In step S405, the security chip 113 may send a user presence verification request to the microcontroller unit 111 according to the identity authentication request.

In step S406, the microcontroller unit 111 may activate the proximity sensor 114 to perform sensing according to the user presence verification request, and the microcontroller unit 111 may also activate the indication unit 115 to send an indication signal. In step S407, the user 130 may, for example, wave his/her hand within a sensing range above the proximity sensor 114, so that the proximity sensor 114 determines that an object is approaching the user verification device 110. In step S408, the proximity sensor 114 may send a user presence notification to the microcontroller unit 111. In step S409, the microcontroller unit 111 sends the user presence notification to the security chip 113 and turns off the indication unit 115 to stop sending the indication signal.

In step S410, the security chip 113 may send an identity authentication response (i.e., security key) corresponding to the identity authentication request to the microcontroller unit 111 according to the user presence notification. In step S411, the microcontroller unit 111 sends the identity authentication response to the connector 112. In step S412, the connector 112 may send the identity authentication response to the electronic apparatus 120. In step S413, the browser or the application executed by the electronic apparatus 120 may agree to the user's login request to perform a login operation. Therefore, the user 130 may perform the identity authentication of the browser or the application through the user verification device 110 to achieve a secure and convenient login operation.

Figure 5:
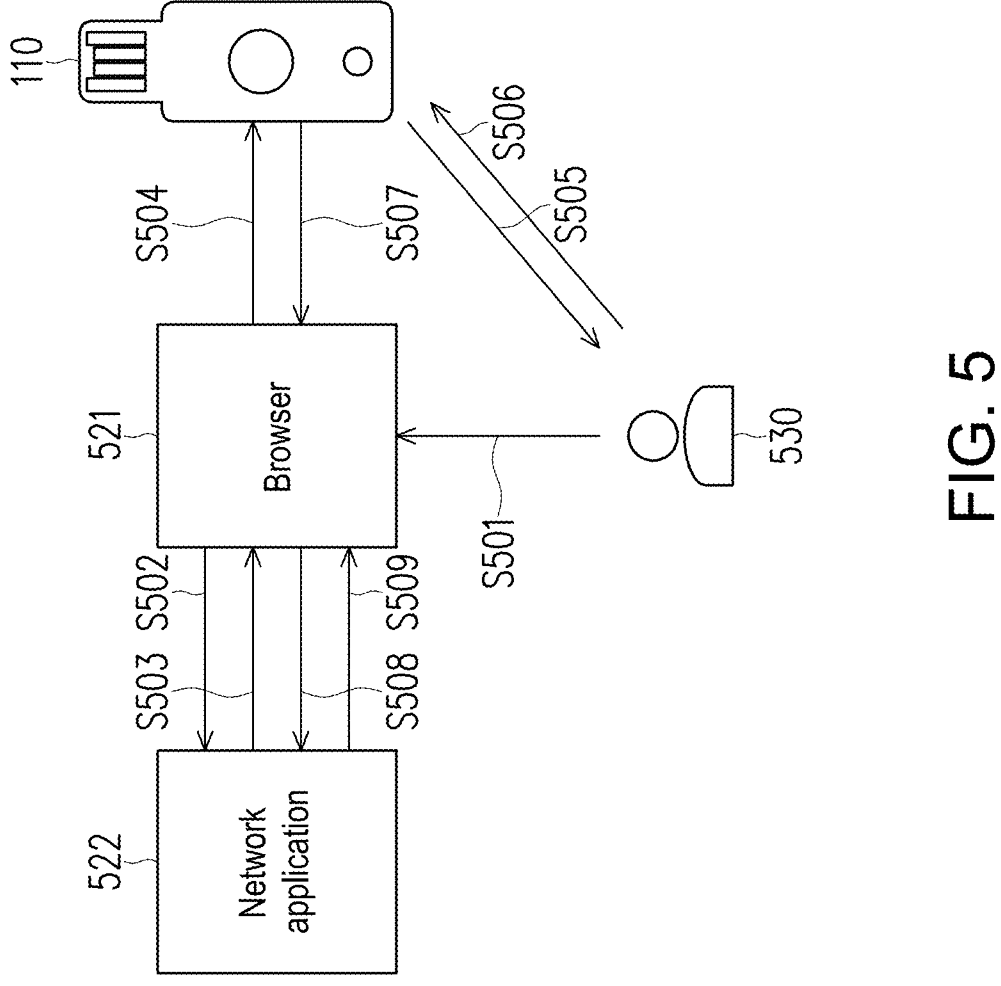
FIG. 5 is a schematic view of a two-factor authentication login operation according to an embodiment of the disclosure.

FIG. 5 is a schematic view of a two-factor authentication login operation according to an embodiment of the disclosure. With reference to FIG. 1 and FIG. 5, an application scenario of a two-factor authentication login operation of a network application is further taken as an example. In this embodiment, a user 540 may operate the electronic apparatus 120 to execute a browser 521 (which may also be an application) to connect to a network application 522 and perform a two-factor authentication (2FA) login operation. In this embodiment, the user 530 may first insert the connection terminal of the user verification device 110 into the corresponding connection port of the electronic apparatus 120, so that the user verification device 110 and the electronic apparatus 120 may communicate with each other. The user verification device 110, the browser 521, the network application 522, and the user 530 may perform the login operation as follows: steps S501 to S509.

In step S501, the user 530 may input a user name and a user password through an input unit (e.g., a keyboard, a mouse, or a touch panel) of the electronic apparatus 120. In step S502, the browser 521 may receive the user name and the user password and send the user name and the user password to the network application 522. In step S503, the network application 522 may send a two-factor authentication request to the browser 521. In step S504, the browser 521 may send an identity authentication request to the user verification device 110 according to the two-factor authentication request.

In step S505, the user verification device 110 may determine whether an object (e.g., the user's hand) is approaching the user verification device 110 through the proximity sensor 114. In step S506, when the user verification device 110 determines that an object is approaching the user verification device 110 through the proximity sensor 114, the user verification device 110 may read a corresponding identity authentication response (i.e., security key) from the security chip 113. In step S507, the user verification device 110 may send the identity authentication response to the electronic apparatus 120 through the connector 112. In step S508, the browser 521 may further send the identity authentication response to the network application 522. In step S509, the network application 522 may agree to allow the browser 521 to perform a two-factor authentication login operation based on the identity authentication response. Therefore, the user 530 may perform the two-factor authentication login operation through the user verification device 110 to log into the network application 522 conveniently and securely.

Figure 6:
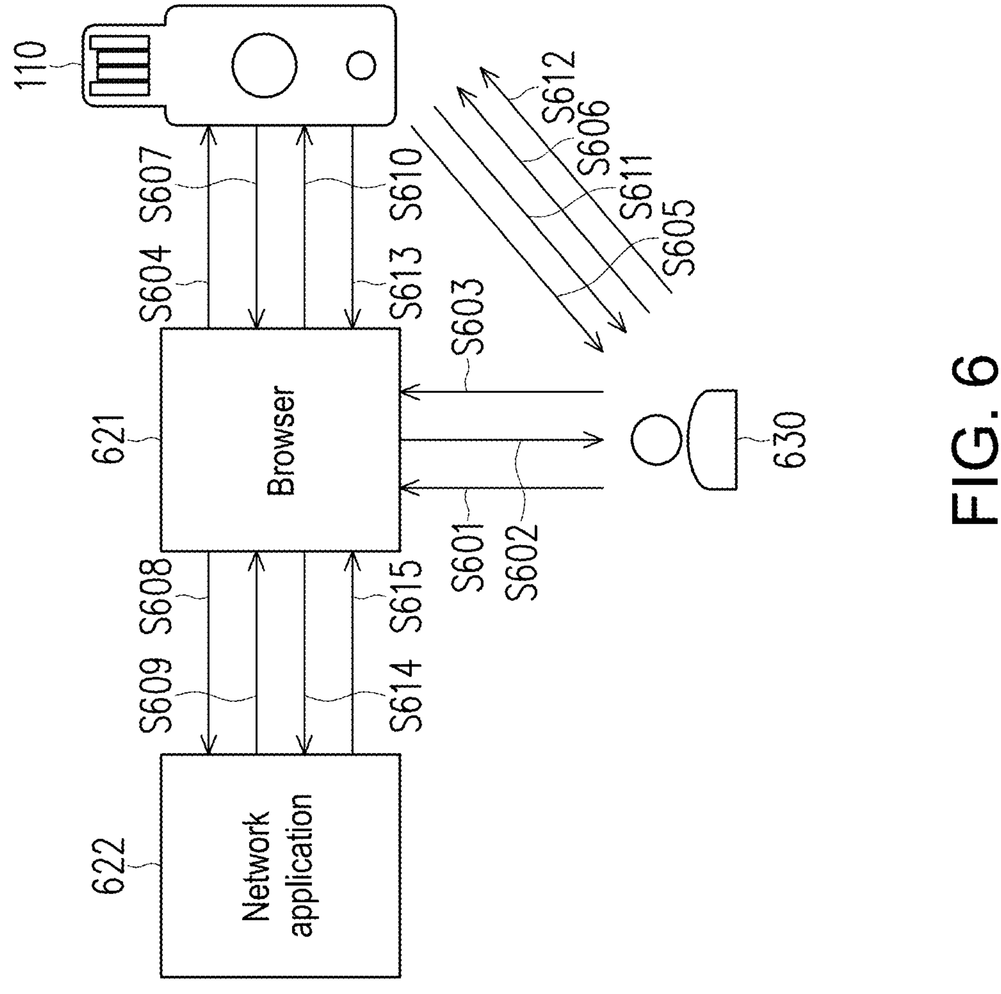
FIG. 6 is a schematic view of a password-free authentication login operation according to an embodiment of the disclosure.

FIG. 6 is a schematic view of a password-free authentication login operation according to an embodiment of the disclosure. With reference to FIG. 1 and FIG. 6, an application scenario of a password-free authentication login operation of a network application is further taken as an example. In this embodiment, a user 630 may operate the electronic apparatus 120 to execute a browser 621 (which may also be an application) to connect to a network application 622 and perform a password-free authentication login operation. In this embodiment, the user 630 may first insert the connection terminal of the user verification device 110 into the corresponding connection port of the electronic apparatus 120, so that the user verification device 110 and the electronic apparatus 120 may communicate with each other. The user verification device 110, the browser 621, the network application 622, and the user 630 may perform the login operation as follows: steps S601 to S615.

In step S601, the user 630 may log into the browser 621. In step S602, the browser 621 may require the user 630 to input a personal identification number (PIN). In step S603, the user 630 may input the personal identity number through an input unit (e.g., a keyboard, a mouse, or a touch panel) of the electronic apparatus 120. In step S604, the browser 621 may verify the personal identity number and send a corresponding user credential request to the user verification device 110.

In step S605, the user verification device 110 may determine whether an object (e.g., the user's hand) is approaching the user verification device 110 through the proximity sensor 114. In step S606, when the user verification device 110 determines that an object is approaching the user verification device 110 through the proximity sensor 114, the user verification device 110 may read a corresponding user credential from the security chip 113. In step S607, the user verification device 110 may send the user certificate credential to the electronic apparatus 120 through the connector 112.

In step S608, the browser 621 may further send the user credential to the network application 622. In step S609, the network application 622 may send an identity authentication request to the electronic apparatus 120 according to the user credential. In step S610, the browser 621 may further send the identity authentication request to the user verification device 110.

In step S611, the user verification device 110 may determine whether an object (e.g., the user's hand) is approaching the user verification device 110 through the proximity sensor 114. In step S612, when the user verification device 110 determines that an object is approaching the user verification device 110 through the proximity sensor 114, the user verification device 110 may read a corresponding identity authentication response (i.e., security key) from the security chip 113. In step S613, the user verification device 110 may send the identity authentication response to the electronic apparatus 120 through the connector 112. In step S614, the browser 621 may further send the identity authentication response to the network application 622. In step S615, the network application 622 may agree to allow the browser 621 to perform a password-free authentication login operation based on the identity authentication response. Therefore, the user 630 may perform the password-free authentication login operation through the user verification device 110 to log into the network application 622 conveniently and securely.

In view of the foregoing, in the user verification device, the authentication system, and the authentication method, a secure identity authentication function can be provided and can be applied to the dual-factor authentication login operation and the password-free authentication login operation. Further, the user confirmation device of the disclosure may enhance the security of authentication in a convenient verification manner through the proximity sensor.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A user verification device for a security key, comprising:

a security chip;

a proximity sensor;

a connector configured to be connected to an electronic apparatus; and a microcontroller unit coupled to the security chip, the proximity sensor, and the connector, wherein the electronic apparatus executes a browser or an application and receives a personal identity number, wherein the browser or the application sends the personal identity number to the user verification device, wherein when the microcontroller unit receives the personal identity number from the electronic apparatus through the connector, the microcontroller unit determines whether the object is approaching the user verification device through the proximity sensor, wherein when the microcontroller unit determines that the object is approaching the user verification device through the proximity sensor, the microcontroller unit reads a user credential from the security chip and outputs the user credential to the electronic apparatus through the connector, wherein the browser or the application sends the user credential to a network application, so that the network application sends the identity authentication request to the browser or the application, and the browser or the application sends the identity authentication request to the user verification device, wherein when the microcontroller unit receives the identity authentication request from the electronic apparatus through the connector, the microcontroller unit determines whether an object is approaching the user verification device through the proximity sensor, wherein when the microcontroller unit determines that the object is approaching the user verification device through the proximity sensor, the microcontroller unit reads an identity authentication response from the security chip and outputs the identity authentication response to the electronic apparatus through the connector.

2. The user verification device according to claim 1, wherein the browser or the application sends the identity authentication response to the network application, so that the network application agrees that the browser or the application performs a password-free authentication login operation.

3. The user verification device according to claim 1, wherein the identity authentication request is a fast identity online (FIDO) request, and the identity authentication response is fast identity online data.

4. The user verification device according to claim 1, further comprising:

an indication unit coupled to the microcontroller unit, wherein when the microcontroller unit receives the identity authentication request from the electronic apparatus through the connector, the microcontroller unit sends out an indication signal through the indication unit.

5. The user verification device according to claim 1, wherein the proximity sensor has a sensing window, and the sensing window emits a sensing signal toward an opening of a body of the user verification device to sense whether the object is approaching the user verification device.

6. The user verification device according to claim 1, wherein the proximity sensor determines whether the object is approaching the user verification device according to whether the time when the object is approaching the user verification device exceeds a predetermined time threshold.

7. The user verification device according to claim 1, wherein at least two of the security chip, the proximity sensor, and the microcontroller unit are integrated into a same chip, and the connector comprises a universal serial bus (USB) interface.

8. An authentication system for a security key, comprising:

an electronic apparatus; and a user verification device, comprising:

a security chip;

a proximity sensor;

a connector configured to be connected to the electronic apparatus; and a microcontroller unit coupled to the security chip, the proximity sensor, and the connector, wherein the electronic apparatus executes a browser or an application and receives a personal identity number, wherein the browser or the application sends the personal identity number to the user verification device, wherein when the microcontroller unit receives the personal identity number from the electronic apparatus through the connector, the microcontroller unit determines whether the object is approaching the user verification device through the proximity sensor, wherein when the microcontroller unit determines that the object is approaching the user verification device through the proximity sensor, the microcontroller unit reads a user credential from the security chip and outputs the user credential to the electronic apparatus through the connector, wherein the browser or the application sends the user credential to a network application, so that the network application sends the identity authentication request to the browser or the application, and the browser or the application sends the identity authentication request to the user verification device, wherein when the microcontroller unit receives the identity authentication request from the electronic apparatus through the connector, the microcontroller unit determines whether an object is approaching the user verification device through the proximity sensor, wherein when the microcontroller unit determines that the object is approaching the user verification device through the proximity sensor, the microcontroller unit reads an identity authentication response from the security chip and outputs the identity authentication response to the electronic apparatus through the connector.

9. The authentication system according to claim 8, wherein the browser or the application sends the identity authentication response to the network application, so that the network application agrees that the browser or the application performs a password-free authentication login operation.

10. An authentication method for a security key, suitable for a user verification device and an electronic apparatus, wherein the electronic apparatus executes a browser or an application, wherein the user verification device comprises a connector, a proximity sensor, and a security chip, wherein the authentication method comprises:

receiving a personal identity number through the browser or the application;

sending the personal identity number to the user verification device through the browser or the application;

determining whether the object is approaching the user verification device through the proximity sensor when the user verification device receives the personal identity number from the electronic apparatus through the connector;

reading a user credential from the security chip and outputting the user credential to the electronic apparatus through the connector when the user verification device determines that the object is approaching the user verification device through the proximity sensor;

sending the user credential to the network application through the browser or the application, so that the network application sends a identity authentication request to the browser or the application, and the browser or the application sends the identity authentication request to the user verification device;

determining whether an object is approaching the user verification device through the proximity sensor when the user verification device receives the identity authentication request from the electronic apparatus through the connector;

reading an identity authentication response from the security chip when the proximity sensor determines that the object is approaching the user verification device; and outputting the identity authentication response to the electronic apparatus through the connector.

11. The authentication method according to claim 10, further comprising:

sending the identity authentication response to the network application through the browser or the application, so that the network application agrees that the browser or the application performs a password-free authentication login operation.

* * * * *